April 22, 1958     J. ESSLINGER, JR     2,831,279
CALENDAR HANDBOOK
Filed Aug. 17, 1956

INVENTOR
JOHN ESSLINGER, JR
BY
ATTORNEY

United States Patent Office 2,831,279
Patented Apr. 22, 1958

2,831,279
CALENDAR HANDBOOK

John Esslinger, Jr., St. Paul, Minn., assignor to Brown & Bigelow, St. Paul, Minn., a corporation of Minnesota Application August 17, 1956, Serial No. 604,729

3 Claims. (Cl. 40—119)

This invention relates to a calendar wherein the sheets of the same are spiral bound along the left hand edge thereof. This provides a calendar having a series of leaves like a book on which information may be printed and illustrated so that the recipient of the calendar may readily refer to said information carried on the pages of the calendar.

A feature resides in having a calendar month appear on the bottom of each page, such as "January," "February," "March," or "April," and so forth to indicate all of the months of the year.

The upper portion of the calendar is covered by a top sheet which is an integral part of the back sheet so that the top sheet forms a front cover portion to cover the top of any one of the sheets when it is turned down. This top sheet may be used for a picture and one form this calendar is called "Gardening Calendar." In the gardening calendar form the sheets or respective leaves of the calendar have illustrations of garden tools, soil tools, maintenance tools and so forth, all of which are related to gardening.

In a calendar of this character it is desirable to have the sheets thereof fold back by means of the spiral binding, when it is desired to indicate a new month of the year, the folded back sheet carrying the information which is of particular interest to gardening and home beautifying in the garden and yard.

Thus, this calendar provides a ready reference which is used as a calendar and as valuable information thereon pertaining to garden which includes the various points that one would wish to know in the "Sowing of Seeds Out of Doors," "The Feeding of the Lawn for Better Results," "Plant Food Hints for When You Work in Your Garden," "The Way You Water is Important" and such valuable information for one to use when gardening. The maintenance of the leaves of the calendar in book form held by the spiral binding along the left edge, so that any one of the leaves may be turned to the back of the calendar and the top cover sheet folded down to cover the top portion of the sheet, however exposing the month of the year on the bottom portion of the sheet, thereby providing a complete reference gardening calendar readily accessible to the recipient at any time.

The foregoing objects and features will be more fully and clearly defined throughout the specification and claims.

Figure 1:
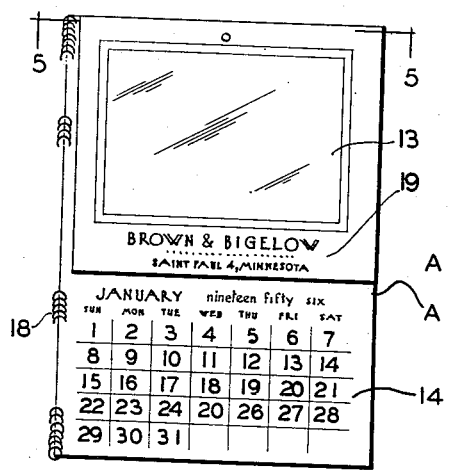
Figure 1 is a front view of the gardening calendar illustrating the month of January along the bottom of the first leaf of the calendar, also showing the cover turned down to cover the top of the front sheet.
Figure 2:
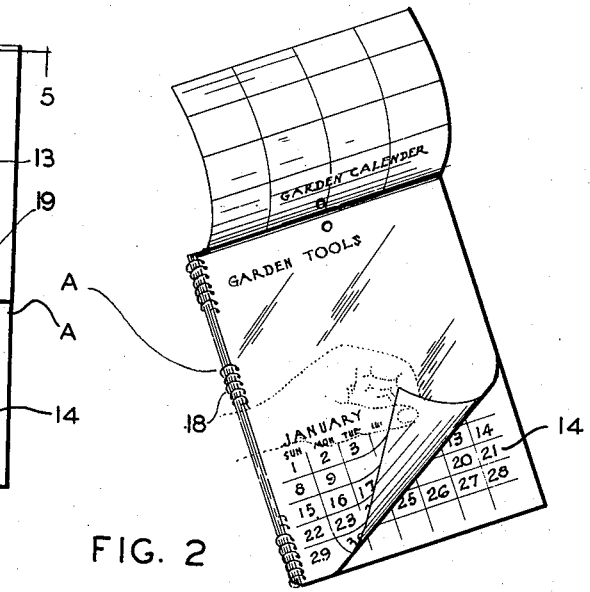
Figure 2 is a perspective showing the gardening calendar with the top sheet partially lifted away from the first sheet of the calendar and the first sheet turned up at the corner to expose a portion of the next month shown on the second sheet of the calendar.
Figure 3:
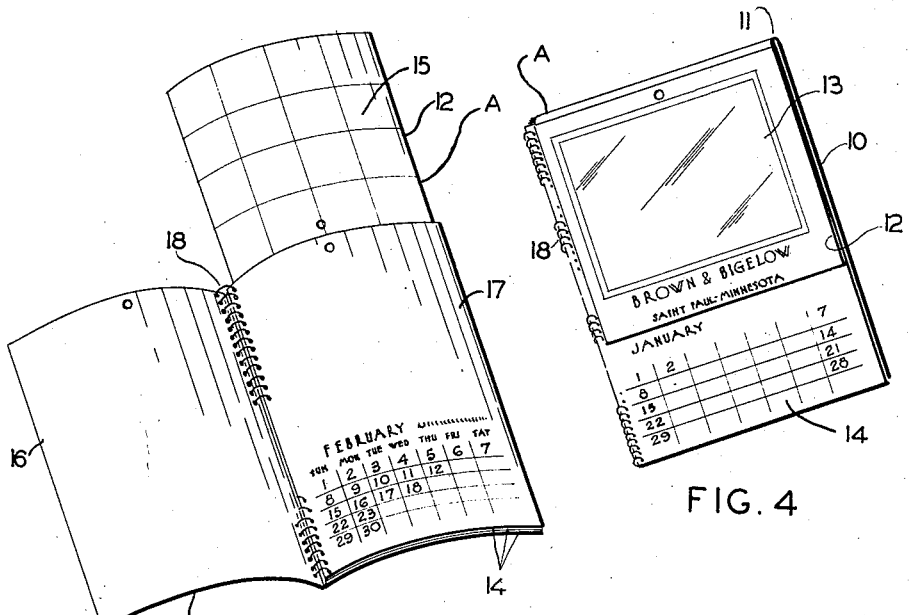
Figure 3 is a perspective of the calendar with the top sheet carrying the month of January turned over on the spiral binding on the left edge thereof and showing the February month on the second sheet, while the top or cover sheet is turned up away from the second sheet thereof.
Figure 4:
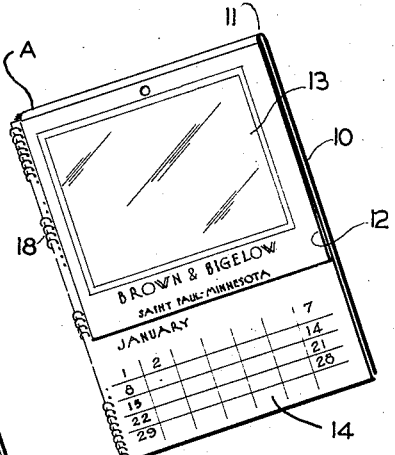
Figure 4 is a perspective view of the gardening calendar when it is in closed position with the month of January on the first sheet, the cover sheet turned down over the top of the first sheet and showing the compact book-like form of the calendar.

The gardening calendar A is illustrated in the drawing and it will be observed that one of the months of the year appear on the front of the calendar such as the month of January as shown in Figure 1.

The calendar A is formed with a rear sheet 10 which folds over at the top 11 to form the front sheet 12 which normally covers the top of the sheets making up the leaves of the calendar.

The top sheet 12 is integral with the back 10. It is desirable to use the outer space 13 on the sheet 12 for a picture such as is normally used on a calendar to add beauty and attraction to the same.

The body of the calendar is made up of a series of leaves 14, each of which carry on their lower face, a different month of the year so that the complete calendar including all of the months of the year, is indicated on each sheet 14 as is illustrated in the various figures, 1 to 4 inclusive, of the drawing.

The inner surface 15 of the cover sheet 12, as well as the back surfaces 16 of each sheet 14 and the top portions 17 of each sheet 14 of the calendar, are adapted to be printed with valuable information to anyone wishing to maintain a garden or to beautify their yard. This information is not shown on the calendar A. The calendar is full of information valuable so far as tools and helpful suggestions to be used in gardening and thus it forms a very desirable record for anyone who wishes to have flowers and a beautiful yard around their home. Therefore, the sheets 14 are bound along the left hand edge with the spiral binding 18. Thus, the calendar A is a book of information to the recipient, devoted entirely to gardening which can be referred to throughout the year and which can be kept as a record in book form.

The material, illustrations and information within the garden calendar A are compiled from the best authorities for such material and therefore, such a calendar is very desirable to the recipient.

Normally a calendar such as A is put out by some concern who wishes to place their name upon the calendar in the space 19. The concern who places their name on the calendar, then gives these calendars to their customers and friends as a good will gesture. Anyone receiving the calendar A whom is interested in gardening ordinarily are very happy to have the same and will invariably refer to the information therein contained. Furthermore, the binding of the respective sheets of the calendar A together by the spiral binding 18 makes it very convenient for the recipient to fold each of the sheets 14 back to the back of the calendar to expose a new sheet and the current month of the year.

Figure 5:
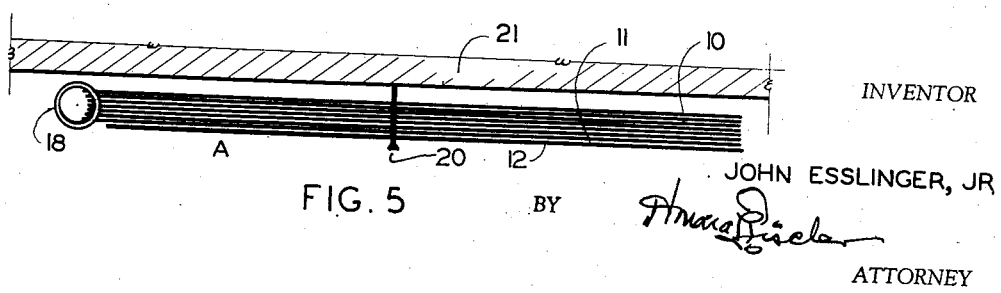
Figure 5 is a top view looking down on the top of the calendar when it is folded in book form and is hung upon a support upon a wall, taken on the line 5—5 of Figure 1.

I have illustrated in Figure 5 a top view looking down on the calendar A when it is folded and hung upon the nail 20 to secure the same to the wall 21.

I claim:

1. A calendar and reference book including a back sheet having an integral portion foldable over the front sheet of the calendar providing space for picture illustrations and covering the top half of the respective sheets forming the calendar, a series of leaves forming the sheets of the calendar, a spiral binding along the left hand side of the sheets of the calendar for supporting the respective sheets in book form, calendar indicia on the bottom half of said sheets exposed below said cover sheet portion to indicate the months of the year, the surfaces of the sheets forming said calendar including the back portion thereof having printed indicia and illustrations thereon which are helpful in gardening thereby performing a ready reference book for the recipient as to the tools and suggestions and material best adapted for use in gardening.

2. A gardening calendar comprising a series of sheets, spiral binding means for a vertical edge of said sheets to hold the same together in book leaf form, a back cover for said sheets having an integral depending sheet portion covering the top of the sheets of the calendar when the same is in folded book form, each of said sheets having calendar indicia printed on the lower face thereof, and said sheets and cover portion having space for illustrations, suggestions, and illustrations of tools which may be used in gardening, said calendar having a hole through all of said sheets and cover to provide means for hanging the calendar on the wall.

3. In a calendar having a series of leaves spirally bound to the vertical edge of a relatively stiff backing sheet, the improvement for providing an information guide in combination with the calendar, said improvement consisting of an integral cover member attached to the top edge of the backing sheet, said cover member being foldable over the leaves of said calendar in such a manner as to expose only the bottom half of said leaves, said bottom half having calendar indicia printed thereon and the remainder of said leaves having information printed thereon.

References Cited in the file of this patent
UNITED STATES PATENTS

| | | |
|---|---|---|
| 1,574,245 | Hamilton | Feb. 23, 1926 |
| 1,810,440 | Shedd | June 16, 1931 |
| 2,075,529 | Leubrie | Mar. 30, 1937 |
| 2,224,414 | Spinner | Dec. 10, 1940 |

FOREIGN PATENTS

| | | |
|---|---|---|
| 273,084 | Switzerland | Apr. 16, 1951 |